(12) United States Patent
Anderson et al.

(10) Patent No.: US 6,248,441 B1
(45) Date of Patent: Jun. 19, 2001

(54) METHOD FOR ENHANCING THE THREE-DIMENSIONAL EFFECT OF A RAISED PLASTIC SURFACE USING IN-MOLD LABELING AND THE LABEL USED THEREWITH

(75) Inventors: Jeffrey Scott Anderson; Jon Spencer Richardson; Steven Dean Eggers, all of Clinton, IA (US)

(73) Assignee: Custom-Pak, Inc., Clinton, IA (US)

( * ) Notice: Subject to any disclaimer, the term of this patent is extended or adjusted under 35 U.S.C. 154(b) by 0 days.

(21) Appl. No.: 09/275,860

(22) Filed: Mar. 24, 1999

(51) Int. Cl.[7] ................................ B32B 7/12; C09J 7/02
(52) U.S. Cl. .................. 428/346; 428/347; 428/42.1; 156/245; 283/81; 283/101
(58) Field of Search ......................... 428/346, 347, 428/354, 42.1; 156/245; 283/81, 101

(56) References Cited

U.S. PATENT DOCUMENTS

| | | |
|---|---|---|
| 4,837,075 * | 6/1989 | Dudley ............................. 428/220 |
| 5,223,315 | 6/1993 | Katsura et al. . |
| 5,238,630 | 8/1993 | Tung . |
| 5,238,720 | 8/1993 | Volkman . |
| 5,256,365 | 10/1993 | Gordon et al. . |
| 5,266,377 | 11/1993 | Kinoshita et al. . |
| 5,639,536 | 6/1997 | Yamazaki et al. . |
| 5,733,615 * | 3/1998 | Rackovan et al. ............... 428/35.7 |
| 5,925,208 * | 7/1999 | Dronzek, Jr. ..................... 156/257 |

* cited by examiner

*Primary Examiner*—Daniel Zirker
(74) *Attorney, Agent, or Firm*—St. Onge Steward Johnston & Reens LLC

(57) ABSTRACT

A method of enhancing the three-dimensional effect of a plastic part and the label used therewith is disclosed. A label for enhancing the three-dimensional visual effect which comprises a plastic core and/or, an insulating layer, and/or a heat-activated adhesive backing is disclosed. The label is aligned on the surface of a relieved mold. When plastic is forced against the back surface of the label, the label is stretched and forced into the relief along with the plastic. The label adheres to the plastic part by either a heat-activated adhesive backing or the core forms a melts/weld interface with the molded part creating a permanent bond between the label and the molded part.

20 Claims, 1 Drawing Sheet

METHOD FOR ENHANCING THE THREE-DIMENSIONAL EFFECT OF A RAISED PLASTIC SURFACE USING IN-MOLD LABELING AND THE LABEL USED THEREWITH

FIELD OF THE INVENTION

The present invention relates to a method for enhancing the visual effect of a three-dimensional molded part using in-mold labeling and the label used therewith, particularly a method and label for enhancing the three-dimensional visual effect of raised surfaces on a blow molded article.

BACKGROUND OF THE INVENTION

It is well known to apply conventional paper and plastic film labels to two-dimensional surfaces of blow molded plastic articles, such as shampoo bottles and beverage containers, after the part has been removed from the mold. To improve the efficiency of blow molding operations, transfer machines were developed which place labels on the blow mold itself before the plastic part is formed. When the plastic article is blow molded, the label either melts or adheres to the two-dimensional container surface.

U.S. Pat. No. 5,266,377, issued to Kinoshita et al., discloses a label and method for applying a label during in-mold molding. The label comprises a printed layer formed on a surface of a non-oriented plastic based film over which a membrane layer is overlapped. The label is inserted into a mold for in-mold labeling and is held in the proper position on the mold using vacuum suction or static electricity. Plastic is then injected into the mold and the membrane layer on the label bonds to the plastic article.

U.S. Pat. No. 5,223,315, issued to Katsura et al., discloses a label for two-dimensional surfaces consisting of a base of stretched film having a thermal shrinkage ratio greater than the mold shrinkage ratio of a plastic constituting the outer surface of a container. Using materials that satisfy these ratios prevents creasing and swelling of the label on containers with polyolefin outer surfaces.

U.S. Pat. No. 5,256,365, issued to Gordon et al., discloses a method of placing a label on mold cavities in a blow molding machine using an in-mold labeling system including first and second magazines with rotary members and vacuum assist.

U.S. Pat. No. 5,639,536, issued to Yamazaki et al., discloses the method of applying a transfer layer having projections and recesses finer than those on a molded part to produce a matte surface with good wear characteristics. The recesses on the molded part are up to approximately 300 microns deep and present therefore, essentially a two-dimensional surface.

The above-mentioned patents work satisfactorily for molded articles with thin walls, such as two-liter plastic beverage bottles and shampoo containers having wall thicknesses of approximately 0.015 to 0.060 inches. These articles retain relatively little heat in the walls compared to thick-walled molded articles, such as cases for power tools, which typically have wall thicknesses of approximately 0.055 to 0.250 inches. Thick-walled articles require a different label capable of withstanding the increased heat retained and subsequently released from the thick-walled sections. Moreover, the above-described background art is generally limited only to a two-dimensional surface and does not enhance the appearance of three-dimensional surfaces.

What is desired, therefore, is a label for in-mold labeling of plastic parts which is capable of being in a mold cavity therefore taking on the three-dimensional appearance of the relieved features or the entire molded product, and which is capable of being used in in-mold labeling operations on thick-walled molded parts which retain a substantial amount of heat in the thick walls. In another aspect, what is desired is a method of enhancing the three-dimensional appearance of a raised surface on a plastic part using an in-mold label.

SUMMARY OF THE INVENTION

Accordingly, it is an object of this invention to provide a label for in-mold labeling of plastic parts that is capable of being in a mold cavity therefore taking on the three-dimensional appearance of the relieved features or the entire molded product.

Another object of this invention is to provide a label which is capable of being used in in-mold labeling operations on thick-walled molded parts which retain a substantial amount of heat in the thick walls.

Yet another object of this invention is to describe a method of enhancing the three-dimensional appearance of a raised surface on a plastic part using an in-mold label.

In one embodiment of the present invention, the label itself comprises a printed plastic, such as polypropylene or polyethylene, having a background and lettering and/or one or more patterns such as photo graphics, a heat-activated adhesive layer on the bottom surface thereof for adhering to the molded article, and a surface layer, such as varnish, on the top surface to insulate the core from the cool mold cavity and/or protect the printed core from damage.

To apply the label, the label first must be positioned on the mold surface using a transfer system, mechanical tooling components, or by hand. The label is precisely held in place on the mold surface by vacuum suction and/or static electricity. A parison, the semi-solid, molten, plastic "tube" that is extruded from the blow molding machine, is dropped between the mold halves. The mold then closes around the parison and air is injected into the parison forcing the parison to take the shape of the mold cavity, i.e., the finished molded part, including any relief cut into the mold cavity. The label is also forced to stretch and take the shape of the cavity relief or part contour by the plastic parison resulting in an enhanced three-dimensional visual effect of the raised article surface. The heat from the parison causes the heat-activated adhesive layer to bond to the molded part.

In another embodiment, the label comprises a plastic core, such as polyethylene or polypropylene, and a surface layer, such as a varnish coating. In this embodiment, when the plastic parison is blown and contacts the label, the heat from the plastic causes the bottom surface of the plastic core to melt and permanently bond to the parison.

The invention and its particular features and advantages will become more apparent from the following detailed description considered with reference to the accompanying drawings.

BRIEF DESCRIPTION OF THE DRAWINGS

FIG. 3b is a perspective view of a molded part manufactured from the mold cavity illustrated in FIG. 3a.

DETAILED DESCRIPTION OF THE INVENTION

The present invention is described as applying to a blow molding process. However, this invention is not limited to blow molding and can be used with any other plastic forming process in which the plastic part is formed into a three-dimensional surface such as injection molding. In blow molding, a parison, the semi-solid, molten, plastic "tube", is produced by extruding heated plastic through a die or an annular ring and pin set. A blow mold, having at least two cavities or a cavity and core set, closes around the parison. Relief is cut into the mold to create raised surfaces on the molded part. Pressurized gas is then injected into the interior of the parison which is forced to conform to the shape of the mold cavities including any contours or relief cut into the mold causing the molded part to have a raised surface. Coolant is generally fed through bores in the mold to cool the mold therefore reducing the time it takes for the molded part to become self-supporting and thus removable from the mold. However, certain engineering plastics require a heated mold to properly form a part and thus the mold may contain heaters or have hot water or oil piped through the mold.

Figure 1:
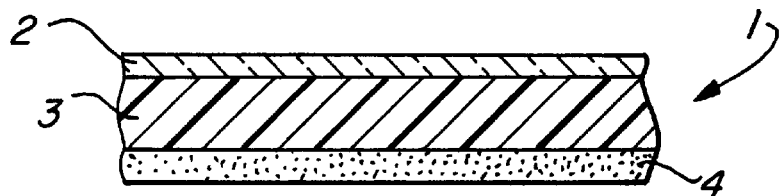
FIG. 1 is a cross sectional view of a label in accordance with the present invention.

Referring first to FIG. 1, label 1 generally comprises a printed, flexible substrate 3 made from a plastic such as polypropylene or polyethylene. The specific core polymer is not critical as long as it is capable of stretching sufficiently to cover the relief and/or contour. Preferably, the core material will be compatible with the material of the molded part to take advantage of melt/weld properties of compatible materials and/or for recycling requirements. For example, a polypropylene or a polypropylene blend core would be compatible with a polypropylene part although a polyethylene core would also melt/weld to a polypropylene part. In a preferred embodiment, core 3 is approximately 0.004 inches thick. However, core 3 may range from at least 0.002 inches to 0.14 inches thick. The core thickness, as well as the overall label thickness, is dependent on factors such as material stretchability and the depth of the cavity relief. For example, thicker labels of a more elastic material work best with deeply relieved parts. Label 1 has been used on relief that is less than 0.005 inches deep to 0.125 inches deep depending on the limitations of the substrate. The core thickness can be relatively thin if surface layer 2 is fairly thick, i.e., at least 0.002 inches.

A heat-activated adhesive layer 4 covers the bottom surface of core 3 to assist the melt/weld adhesion of the label to the molded article. In a preferred embodiment, adhesive layer 4 is either sprayed or rolled on during the printing process, although other known means may be used. When adhesive layer 4 is used, the core material may or may not actually bond to the part. Therefore, any type of label, such as a foil-type label, may be used having material that is very dissimilar to that of the molded part.

A surface layer 2 covers the top surface of label 1. In a preferred embodiment, surface layer 2 is a varnish coating, however, an over-laminate such as polypropylene may also be used. Surface layer 2 insulates core 3 from the relatively cold mold surface allowing the molded article and core 3 to remain at elevated temperatures longer to better melt and bond to the surface of the part. Core 3 is more likely to melt and bond to the plastic part if core 3 is thin and insulating layer 2 is thick. Surface layer 2 is not generally necessary for insulating purposes if adhesive layer 4 is used to attach the label rather than melt welding. However, in all circumstances, surface layer 2 provides scuff protection to printed core 3. Surface layer 2 may be permanently bonded to core 3 and remain as part as the label or may be a temporary, readily-strippable connection that is peeled off the label at a point after the molded part is removed from the mold.

The above-mentioned thicknesses are used to apply the label to thick-walled parts which retain more heat in the walls than thin-walled parts. Present thin labels used on thin-walled parts may distort when subjected to heat contained in thick-walled parts.

In another embodiment, adhesive layer 4 is not used. Label 1 adheres to the molded article by a melt/weld interface between core 3 and the molded article. In this case, it is important that the core material is compatible with the molded part material since there is no adhesive to aid the adherence of label I to the molded part. Dissimilar labels, such as nylon and polyethylene, have different melt temperatures which make it very difficult to form an effective melt/weld interface and therefore generally require adhesive layer 4.

Figure 2:
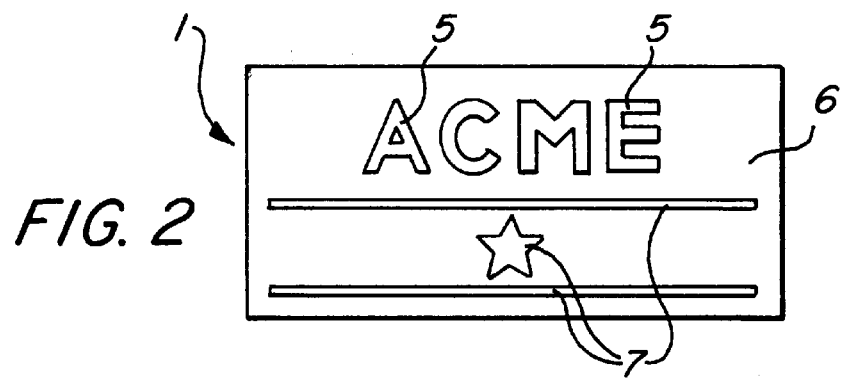
FIG. 2 is a plan view of the label of FIG. 1 showing the lettering which may be raised to produce a three dimensional effect.

Referring now to FIG. 2, printed label 1 may comprise a background 6 and pattern 7, lettering 5, and/or photo graphics which may be of the same or different color as the background. The pattern or lettering that will be raised may be shadowed in different colors to create a multi-colored raised wall on the finished part. In the illustrated label, lettering 5 is designed to conform to the raised article surface and is of a different color to produce a more dramatic three-dimensional effect when label 1 is bonded to the finish part. Any part of label 1 may be raised.

Figure 3A:
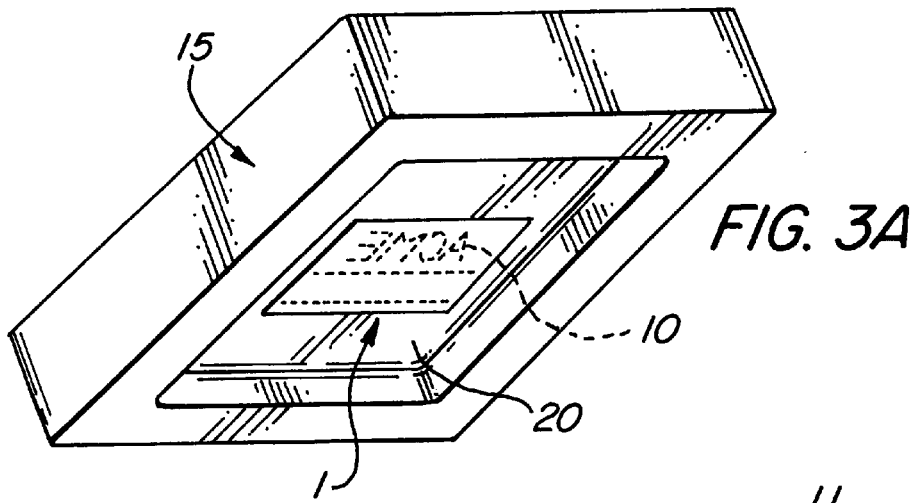
FIG. 3a is a perspective view of one mold cavity used to produce the label of FIG. 1 illustrating the cavity relief.
Figure 3B:
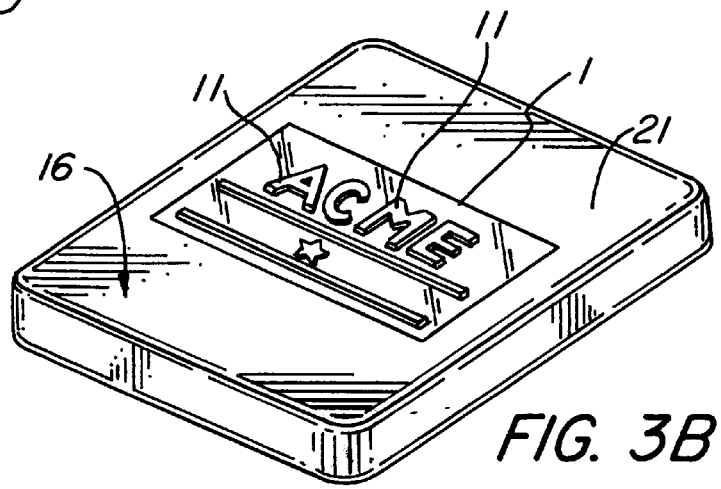

As shown in FIG. 3a, cavity 15 of a blow molding tool having cavity mold part surface 20 also has cavity relief 10 further cut into the cavity surface 20 such that in the molded part 16, relief 11 stands out from the part surface 21 (as shown in FIG. 3b).

To enhance the three-dimensional effect, label 1 is placed on mold cavity 15 with the top surface of label 1 contacting cavity surface 20 by a transfer machine, such as a robotic arm, of the type well known in the industry and typically held in place by either a vacuum and/or static electricity. Label 1 must be positioned such that lettering 5 or pattern 7, which is desired to be raised, is properly aligned with cavity relief 10.

Once label 1 is positioned and the parison drops, the blow mold then closes around the parison. The parison is then blown and the plastic takes the form of the mold including filling in any cavity relief 10. This results in label 1 being stretched and forced to take the shape of the cavity relief 10 causing label 1 to become three-dimensional.

For thick-walled parts, it may be advantageous to use a separate heated plate in the label area of the mold cavity to subject the label to a higher temperature to better ensure a proper weld/melt interface between label 1 and the molded part. Of course, a heated plate may not be necessary if an adhesive layer is used. Thin-walled parts generally do not require a separate heated plate.

The present invention, therefore, provides a label for in-mold labeling of plastic parts which is capable of being in a mold cavity therefore taking on the three-dimensional appearance of the relieved features or the entire molded product, and which is capable of being used in in-mold labeling operations on thick-walled molded parts which retain a substantial amount of heat in the thick walls. In another aspect, the present invention provides a method of enhancing the three-dimensional appearance of a raised surface on a plastic part using an in-mold label.

Although the present invention has been described in reference to a thick-walled structure, the above-described invention works equally well with thin-walled structures.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An in-mold label for enhancing the visual effect of a three-dimensional molded part having a three-dimensional part surface with at least one raised area, the label comprising:
   a flexible substrate layer adapted to stretch and assume the shape of the part surface during molding, said flexible substrate layer having a first surface and a second surface and having at least one printed area aligned with the at least one raised area of the part surface, the at least one printed area having a shape corresponding to a shape of the at least one raised area with which it is aligned;
   heat-activated adhesive layer applied to the first surface of said flexible substrate layer; and
   wherein said heat-activated adhesive layer adheres said flexible substrate layer to the part surface during molding.

2. The in-mold label of claim 1 further comprising a protective layer attached to the second surface of said flexible substrate layer to provide scuff protection to said flexible substrate layer.

3. The in-mold label of claim 2 wherein said protective layer is formed from an insulating material to insulate said flexible substrate layer and said heat-activated adhesive layer from a mold used to form the molded part, thereby allowing the molded part, said flexible substrate layer and said heat-activated adhesive layer to remain at an elevated temperature longer to better bond the label to the molded part.

4. The in-mold label of claim 1 wherein said flexible substrate layer is formed from a thermo-plastic material which is chemically compatible with the part surface so that, in addition to said heat-activated adhesive layer adhering said flexible substrate layer to the part surface, said flexible substrate layer welds to the three-dimensional part surface during molding.

5. The in-mold label of claim 4 wherein said flexible substrate layer is formed from polypropylene.

6. The in-mold label of claim 4 wherein said flexible substrate layer is formed from polyethylene.

7. An in-mold label for enhancing the visual effect of a three-dimensional molded part having a three-dimensional part surface with at least one raised area, the label comprising:
   a flexible substrate layer adapted to stretch and assume the shape of the part surface during molding, said flexible substrate layer having a first surface and a second surface and having at least one printed area aligned with the at least one raised area of the part surface, the at least one printed area having a shape corresponding to a shape of the at least one raised area with which it is aligned; and
   wherein said flexible substrate layer is formed from a thermo-plastic material which is chemically compatible with the part surface so that the first surface of said flexible substrate layer welds to the part surface during molding.

8. The in-mold label of claim 7 further comprising a protective layer attached to the second surface of said flexible substrate layer to provide scuff protection to said flexible substrate layer.

9. The in-mold label of claim 8 wherein said protective layer is formed from an insulating material to insulate said flexible substrate layer from a mold used to form the molded part, thereby allowing the molded part and said flexible substrate layer to remain at an elevated temperature longer to better bond the label to the molded part.

10. The in-mold label of claim 7 wherein said flexible substrate layer is formed from polypropylene.

11. The in-mold label of claim 7 wherein said flexible substrate layer is formed from polyethylene.

12. The in-mold label of claim 7 further comprising a heat-activated adhesive layer applied to the first surface of said flexible substrate layer to adhere said flexible substrate layer to the part surface during molding, thereby enhancing the bond between said flexible substrate layer and the part surface.

13. A molded article comprising:
   at least one molded part having a three-dimensional part surface with at least one raised area; and
   a label comprising:
      a flexible substrate layer adapted to stretch and assume the shape of the part surface during molding, said flexible substrate layer having a first surface and a second surface and having at least one printed area aligned with the at least one raised area of the part surface, the at least one printed area having a shape corresponding to a shape of the at least one raised area with which it is aligned;
      a heat-activated adhesive layer applied to the first surface of said flexible substrate layer; and
      wherein said heat-activated adhesive layer adheres said flexible substrate layer to the part surface during molding.

14. The molded article of claim 13 wherein said label further comprises a protective layer attached to the second surface of said flexible substrate layer to provide scuff protection to said flexible substrate layer.

15. The molded article of claim 14 wherein said protective layer is formed from an insulating material to insulate said flexible substrate layer and said heat-activated adhesive layer from a mold used to form the molded part, thereby allowing the molded part, said flexible substrate layer and said heat-activated adhesive layer to remain at an elevated temperature longer to better bond the label to the molded part.

16. The molded article of claim 13 wherein said flexible substrate layer is formed from a thermo-plastic material which is chemically compatible with the part surface so that, in addition to said heat-activated adhesive layer adhering said flexible substrate layer to the part surface, said flexible substrate layer welds to the three-dimensional part surface during molding.

17. A molded article comprising:
   at least one molded part having a three-dimensional part surface with at least one raised area; and
   a label comprising:
      a flexible substrate layer adapted to stretch and assume the shape of the part surface during molding, said flexible substrate layer having a first surface and a second surface and having at least one printed area aligned with the at least one raised area of the part surface, the at least one printed area having a shape corresponding to a shape of the at least one raised area with which it is aligned; and wherein said flexible substrate layer is formed from a thermo-plastic material which is chemically compatible with the part surface so that the first surface of said flexible substrate layer welds to the part surface during molding.

18. The molded article of claim 17 wherein said label further comprises a protective layer attached to the second surface of said flexible substrate layer to provide scuff protection to said flexible substrate layer.

19. The molded article of claim 18 wherein said protective layer is formed from an insulating material to insulate said flexible substrate layer from a mold used to form the molded part, thereby allowing the molded part and said flexible substrate layer to remain at an elevated temperature longer to better bond the label to the molded part.

20. The molded article of claim 17 wherein said label further comprises a heat-activated adhesive layer applied to the first surface of said flexible substrate layer to adhere said flexible substrate layer to the part surface during molding, thereby enhancing the bond between said flexible substrate layer and the part surface.

* * * * *